April 26, 1960  J. W. STUNTZ  2,934,708
SIGNAL COMPARATOR AND EVALUATION CIRCUIT
Filed April 17, 1957  2 Sheets-Sheet 1

*INVENTOR.*
JOHN W. STUNTZ
BY
ATTYS

INVENTOR.
JOHN W. STUNTZ

United States Patent Office 2,934,708
Patented Apr. 26, 1960

2,934,708

SIGNAL COMPARATOR AND EVALUATION CIRCUIT

John W. Stuntz, Hyattsville, Md., assignor, by mesne assignments, to the United States of America as represented by the Secretary of the Navy Application April 17, 1957, Serial No. 653,503

18 Claims. (Cl. 328—146)

This invention relates generally to an electrical circuit apparatus which is selectively responsive to the cyclic pattern of a signature or other intelligence signals applied thereto. More particularly, the present invention is concerned with a signal comparator circuit for developing an output control signal correlative to the circuit determination of which sequence, or succession, of alternate waveforms of signals of the applied signature is the major sequence signal.

More specifically, this invention contemplates a signal comparator, or decider, circuit utilizing a novel componential arrangement, or combination, of conventional circuitry for separating the alternate periodic major and minor signal sequences of the applied signature, or envelope waveform, into separate signal channels, for effecting a polarity inversion of the signal sequence on one of said channels, and for integrating the resultant difference signal between the sequence signals on said channels thereby developing a control signal indicative of the major sequence of the applied signature. The invention additionally contemplates synchronizing means for insuring the appearance of only one sequence upon each of said signal channels. The invention also provides means for the major sequence determination to be accurately made during a predetermined small signature period.

In the field of evaluation analysis, it is frequently the practice to cyclically derive dissimilar successive signals representatively corresponding to different data characteristics. These signals are then applied to a suitable circuit arrangement for developing an output signal which is indicative of the cyclical occurrence of a predetermined one of the dissimilar signals. It is the general purpose of this invention to provide such a circuit arrangement.

Although circuits have been heretofore devised to accomplish this purpose, these prior art circuits have not been found to perform entirely satisfactorily for applications wherein an accurate major sequence selection is to be made over a small signature period. Additionally, the prior art circuits have been found to lack the computation sensitivities essential for an accurate selection, or determination, in applications where only a small percentage difference exists between the peak amplitudes of the major and minor sequences of the applied signature.

Accordingly, one object of the present invention is the provision of a new and improved decider circuit substantially overcoming the limitations and disadvantages of similar prior art circuits.

Another object of the present invention resides in the provision of a novel and simple combination of conventional circuitry for rapidly and accurately determining the major sequence in a signature composed of a plurality of alternate recurring sequences.

Still another object of the present invention is to provide a new and improved signal comparator circuit.

A further object of the present invention is to provide a new and improved peak amplitude comparator circuit capable of selecting the major peak sequence signal of a pair of alternate periodic peak sequence signals and for applying the selected major peak sequence signal to an utilization device.

A still further object of the present invention is to provide a signal comparator and selector system for determining the major waveform sequence in an applied intelligence signal composed of a pair of alternately recurring waveform sequences of divers amplitudes and for applying the major waveform sequence to an utilization apparatus.

Other objects and many of the attendant advantages of this invention will be readily appreciated as the same becomes better understood by reference to the following detailed description when considered in connection with the accompanying drawings wherein.

Figure 1A:
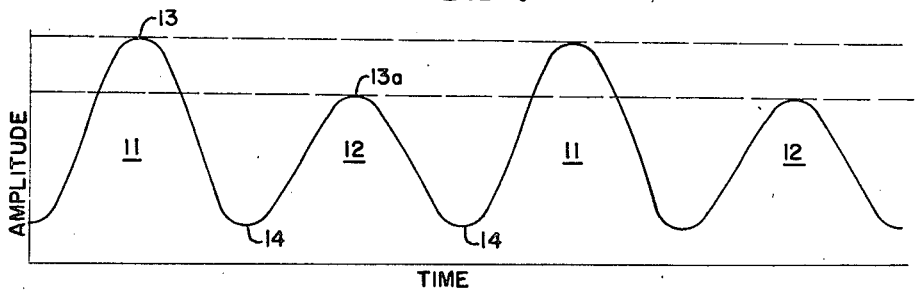
Figs. 1a and 1b illustrate the type of signature signals to be acted upon by the signal comparator and selector circuit of the present invention.
Figure 1B:
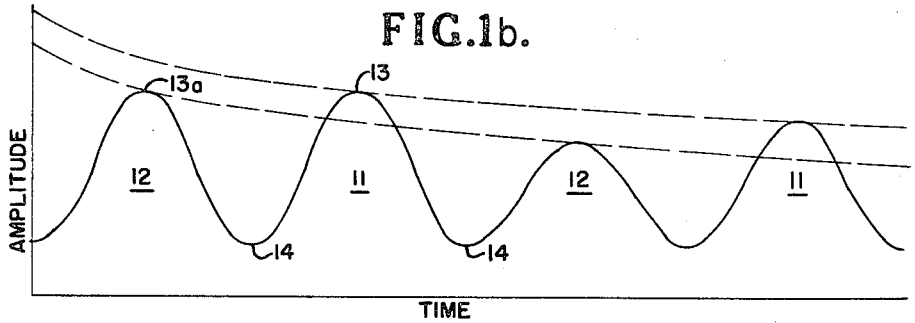

Referring now to Figs. 1a and 1b, it may be seen that the signature signal to be analyzed by the comparator system of the instant invention comprises an asymmetrical waveform consisting of an alternate succession of periodic major and minor lobes, respectively designated by the reference numerals 11 and 12. The positive peak amplitude 13 of major lobes 11 may either be of the same magnitude, as shown in Figs. 1a, or of a diminishing amplitude as shown by Fig. 1b, wherein an inverse succession of periodic sequences is illustrated; similarly, peaks 13a may be uniform or diminishing as shown in Figs. 1a and 1b, respectively. A negative peak amplitude designated by the reference numeral 14, interconnects the major and minor lobe sequences of the signature, the peaks 14 being shown as having uniform amplitude level for illustrative purposes only, but are not necessarily of uniform amplitude level.

Figure 2:
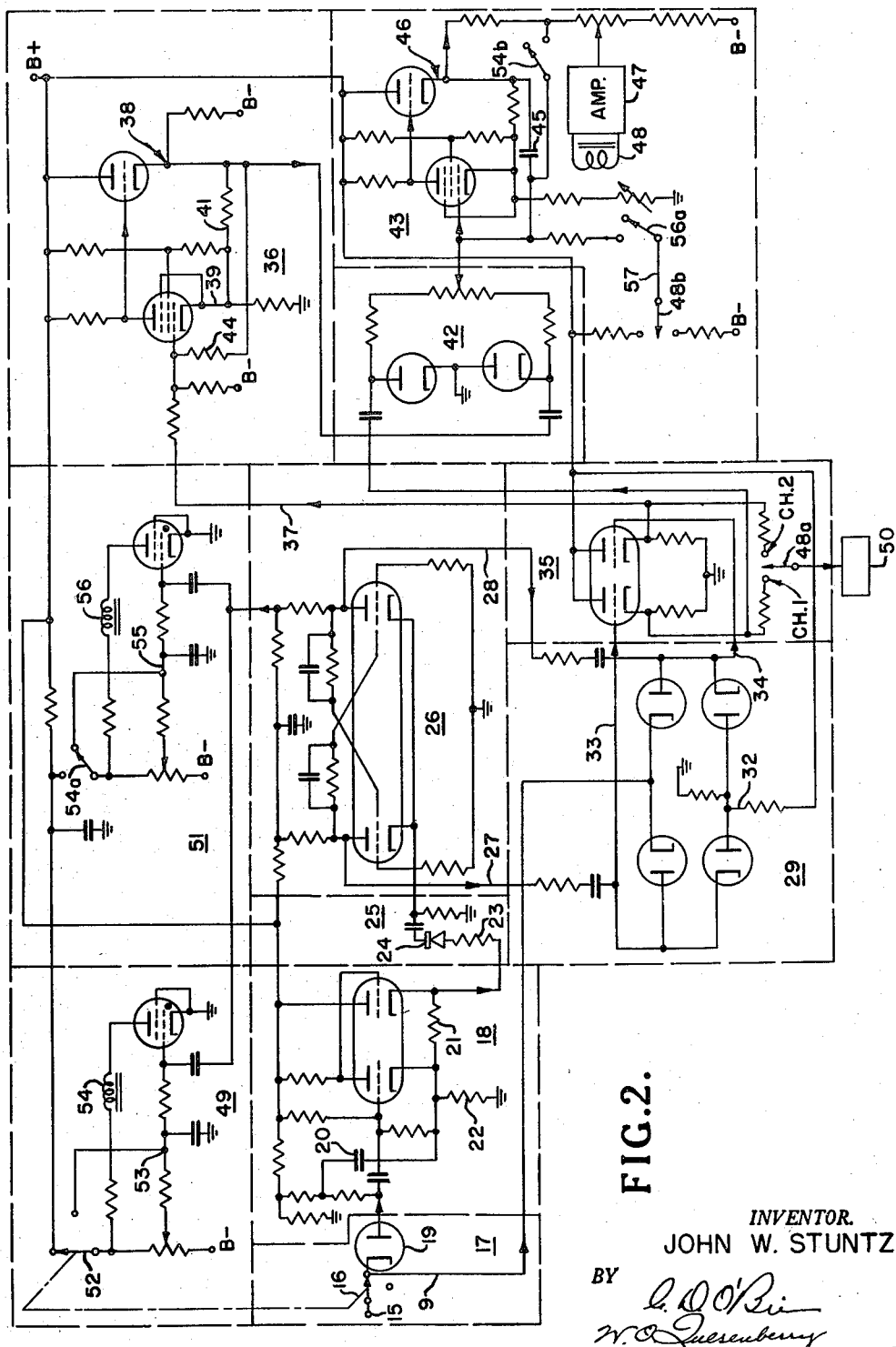
Fig. 2 is a schematic diagrammatic view of the signal comparator and selector circuit.

Referring now to Fig. 2 whereon a simplified circuit diagram of the alternate sequence comparator and major lobe sequence selector circuit of the present invention is shown as consisting essentially of a plurality of successively arranged elemental circuit stages shown in the dotted outline blocks. The signature is applied to the system at terminal 15 and through switch 16 to an input circuit 17, the output of which is applied through a coupling capacitor to the trigger generator 18. The input circuit 17 includes a self-biased diode 19 which operates as a negative peak amplitude selector by being rendered conductive substantially in the vicinity of the occurrence of each negative peak 14 of the signature applied to terminal 15. As soon as diode 19 conducts, a negative potential signal is applied to the control grid of the left half section of a dual section tube of a trigger generator circuit 18, which circuit may be a conventional bi-stable cathode coupled multivibrator. The circuit parameters associated with the dual section electron tube of the trigger generator are selected in the well known manner to normally maintain the left half tube section conductive and the right half tube section cut-off. The applied negative signal renders the left half tube section cut-off whereupon the right half-section is rendered conductive and the cathode potential level on the right half tube section is increased. As the amplitude level of the waveform increases above negative peak level 14, the diode 19 is rendered nonconductive and the impulse generator 18 returns to its initial condition whereupon the cathode potential level of the right half tube section is reduced to its initial level. The waveform of the output signal resulting from the hereinabove described operation of the trigger generator 18 is a positive rectangular pulse having a fast rise time at a time just slightly before each negative peak 14 of the applied signature. Retriggering of the trigger generator is facilitated by minimization of the familiar hysteresis effect of direct-coupled trigger circuits by the degenerative effect of cathode resistor 21 and by return of the load by-pass capacitor 20 of diode 19 to a grounded common-cathode resistor 22. The output signal of the trigger generator 18 is coupled through an isolating resistor 23 and a semiconductor type diode 24 to a differentiating circuit 25 wherein a differentiated pulse of positive polarity is developed in response to each positive rectangular pulse output of trigger generator 18 for cathode triggering a multivibrator 26 of the Eccles-Jordan type. Inasmuch as the output impulses of the trigger generator 18 occur approximately at the time of each negative peak 14 of the applied signature, the application of this signal to the multivibrator 26 results in the alternate development of positive polarity output impulses at the output conductors 27 and 28 at substantially these times.

Figure 3A:
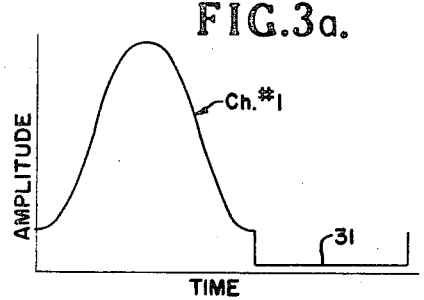
Figs. 3a and 3b illustrate the waveforms on the signal channels of the circuit in Fig. 2; and, Fig. 4 illustrates the waveform of the difference signal applied to the integrator of the circuit shown in Fig. 2.
Figure 3B:
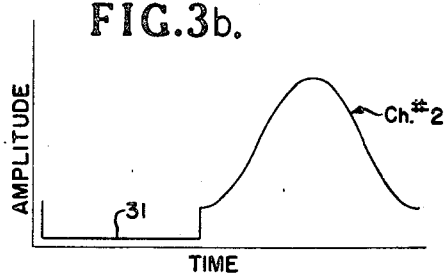

The signature applied at input terminal 15 is also transmitted via conductor 9 to a ring, or balanced diode bridge, modulator, indicated generally as 29, to which the alternate output impulses of multivibrator 26 are also applied through conductors 27 and 28. The modulator 29 driven by the impulses from multivibrator 26, separates the signature signal applied thereto via conductor 9 into two separate channels represented by conductors 33 and 34. Since the driver impulses from multivibrator 26 occur substantially at the time of the transition from the major sequence 11 to the minor sequence 12, or vice versa, these impulses function as synchronizing impulses for insuring that the major sequence is applied to one output channel of bridge modulator 29, either lead 33 or 34, while the minor sequence is applied to the other of these channels. The waveforms appearing on the modulator output channels, which for descriptive purposes may be designated as channel 1 and channel 2, is illustrated in Figs. 3a and 3b respectively. The flat portion 31 of the illustrated waveforms for both signal channels occurs at a potential level established by the ratio of the resistance of a voltage divider network 32 included in the ring modulator 29. This potential level is not of a critical magnitude but is preferably slightly lower than the most negative portion, or peak, of the input signature. Additionally, since this flat portion serves as a reference level to which the relative amplitudes of the alternate sequences are measured, it is preferable that the potential level of portions 31 to be substantially the same in both sequence channels. The dual sequence channel outputs of the ring modulator 29 are transmitted through channel conductors 33 and 34 to a cathode follower buffer amplifier 35 which provides the current required by the succeeding circuits, or stages of the system without unbalancing the ring modulator.

In order to provide for amplitude comparison of the major and minor sequences, as will hereinafter be more fully explained, the sequence impressed on one channel, which for descriptive purposes will be considered to be channel 2, is transmitted via conductor 37 to a phase inverter stage 36 wherein the polarity of the sequence signal is inverted. The phase inverter 36 consists of a slightly modified conventional "see-saw" circuit wherein equal input and feedback resistors are utilized in a high-gain amplifier for effecting a substantially unity gain characteristic. One slight modification to the conventional circuit consists of a cathode follower circuit 38 adjunct to the phase inverter amplifier 39 for permitting handling of substantially large load currents without loss of gain in the stage. Another slight modification in the circuit consists of the addition of a regenerative feedback circuit 41 from the cathode follower 38 to the cathode of the phase inverter amplifier 39. Proper adjustment of this regeneration circuit will yield an essentially infinite amplifier gain in the vicinity of the operating point thereby producing phase inversion at unity gain to the precision of the feedback resistors. It is to be noted that the resulting essentially infinite gain is not accompanied by any instability due to the manner of its inclusion in a multiple feedback arrangement.

Figure 4:
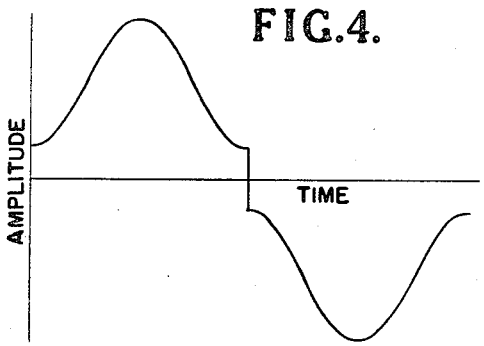

The inverted polarity sequence signal of channel 2 as well as the original sequence signal of channel 1 is fed into a balanced clamp circuit 42 wherein the two sequence signals are algebraically added to provide an input signal for the integrator 43. Inasmuch as the addition of the unlike polarity sequence signals is effectively a subtraction of one sequence signal from the other, the integrator input signal is a resultant difference signal based on a ground reference, as illustrated by the waveform in Fig. 4. Operation of the integrator 43 upon this difference signal, over a predetermined computing interval, results in the development of an integrated output signal having a polarity indicative of the signal channel upon which the major sequence 11 appears i.e., if the magnitude of the sequence signal on channel 1 exceeds that of inverted sequence signal on channel 2, an integrated signal of a negative polarity results, if the magnitude of the inverted sequence signal of channel 2 exceeds that of the sequence signal on channel 1, an integrated signal of a positive polarity results, and if both sequence signals are of equal magnitude, no integrated output signal is developed. The integrated output signal is transmitted to a conventional cathode follower circuit 46 wherein a suitable control signal representative of the polarity of the integrated signal is produced for transmission to a conventional relay amplifier 47 thereby to effect actuation of a relay 48. Actuation of relay 48 results in the movement of ganged relay contact arms 48a and 48b from their initial position to a moved position conforming to the polarity of the control signal. More specifically, relay contact arm 48a operates to connect a utilization device 50 to the channel transmitting the major sequence 11 of the applied signature thereby to effect the application of the major sequence signal thereto, while relay contact arm 48b serves to connect the integrator 43 to a unidirectional energy source of a polarity correlative to the polarity of the output difference signal of clamp circuit 42.

To selectively regulate the computing interval of the integrator stage 43, a conventional time delay circuit 49 and a conventional interval timer circuit 51 are included in the decider circuit. The energization of the delay circuit 49 is affected by switch 52, which is ganged to the signal input switch 16. Consequently, the time delay circuit is energized concurrently with the application of the signature to the decider circuit. An R-C delay network 53 is included in the time delay circuit 49 to prevent firing of the gas tube therein until a predetermined period after application of the signature. The time delay provided by circuit 49 is selected to be of a suitable short duration to delay the operation of the integrator stage 43 upon the applied signature until after the passage of a few initial waveforms thereby insuring operation of the integrator over a stabilized portion of the signature. Additionally, firing of the gas tube and consequent actuation of relay 54 is synchronized to the cyclic rate of the alternate sequences of the applied signature by the transmittal of positive impulses from the multivibrator 26 to the grid of the gas tube of delay circuit 49. Actuation of relay 54 effects movement of relay contact arms 54a and 54b, which arms are ganged for movement in unison, thereby resulting in the simultaneous energization of interval timer 51 and activation of integrator 43.

Upon energization of the computation interval timer 51, an R-C network 55 functions, by selection of R-C parametric values effective to define a predetermined time interval, to establish the computing duration of the integrator 43 by prolonging the potential level buildup at the grid of the interval timer gas tube for a period corresponding to a predetermined integral number of alternate sequences of the applied signature. Additionally, as in the time delay circuit 49, positive impulses from multivibrator 26 are applied to the control grid of the interval timer gas tube to synchronize the firing of the interval timer tube at a time of sequence transition in the applied signature. Firing of the interval timer tube actuates relay 56 whereupon relay contact arm 56a is moved from its normally open position, as shown, to a closed position thereby to apply the unidirectional potential energy selected by the hereinbefore described movement of relay contact arm 48b to the integrator 43 via conductor 57. The connection of integrator 43 to this source is effective to impress a signal upon the integrator 43 of a polarity correlative to the polarity of the integrated output signal of the integrator at the termination of the computation period whereby the relay 48 may be maitnained in the position to which it was actuated at the expiration of the computation period.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Electrical apparatus for selecting the major sequence of a pair of alternate sequence signals applied thereto comprising first circuit means for developing impulses at a rate proportional to the periodicity of the applied pair of sequence signals, second circuit means connected to receive said pair of signals and controlled by said developed impulses for separating the received pair of sequence signals into separate signal channels, third circuit means responsive to both of said separate signal channels for subtracting the output signal of a first channel from the output signal of a second channel and for developing therefrom a resultant signal corresponding to the major sequence of the applied pair of sequence signals, and fifth circuit responsive to said resultant signal for effecting application of the major sequence signal to an utilization device.

2. Electrical apparatus for determining the major sequence of a pair of alternate periodic sequence signals applied thereto comprising impulse generating means for producing impulses at a rate correlative to the periodicity of the applied pair of sequence signals, first circuit means actuated by said impulses for separating the applied pair of periodic sequence signals into two independent channels, the first of said channels transmitting one periodic sequence signal and the second of said channels transmitting the other periodic sequence signal, second circuit means for effecting polarity inversion of the sequence signal on said first channel, third circuit means operatively connected to said second channel and to said second circuit means for developing a resultant difference signal having a polarity correlative to the major sequence of the sequence signals on said channels, and fourth circuit means responsive to the polarity of said resultant signal for effecting application of the major sequence signal to an utilization device.

3. An electrical circuit for determining the major sequence of a pair of alternate substantially sinusoidal periodic sequence signals comprising an input circuit to which the pair of periodic sequence signals are applied, said circuit including normally non-conducting means adapted to being rendered conductive substantially during the occurrence of the negative portions of the applied sequence signals, first circuit means for developing a trigger signal upon said normally non-conducting means being rendered conductive, impulse generating means for developing an alternate output impulse signal in response to said developed trigger signal, second circuit means connected to receive said periodic signals from said input circuit and driven by said alternate output impulse signal for separating the received pair of periodic sequence signals into the componential periodic sequence signals thereof and for applying each of said componential sequence signals to a respective transmission channel, third circuit means for inverting the polarity of the componential sequence signal on a first of said transmission channels, fourth circuit means responsively coupled to the other of said channels and to said third circuit means for developing therefrom a resultant difference signal having a polarity correlative to the major one of the componential sequence signals on said transmission channels, and fifth circuit means responsive to the polarity of said resultant signal for producing an output utilization signal representative of said major sequence signal.

4. An electrical circuit according to claim 3 wherein said normally non-conducting means of said input circuit comprises a self-biased electron discharge device.

5. An electrical circuit according to claim 3 wherein said first circuit means comprises a bi-stable multivibrator circuit.

6. An electrical circuit according to claim 3 wherein said impulse generating means comprises a multivibrator.

7. An electrical circuit according to claim 3 wherein said second circuit means comprises a ring modulator circuit.

8. An electrical circuit according to claim 3 wherein said third circuit means comprises a phase inverter amplifier circuit.

9. An electrical circuit according to claim 3 wherein said fourth circuit means includes a balanced clamping circuit.

10. An electrical circuit according to claim 3 wherein said fourth circuit means further includes an integrating circuit.

11. An electrical circuit according to claim 3 wherein said fifth circuit means includes a relay actuating amplifier circuit.

12. An electrical circuit according to claim 4 and further including a differentiating circuit interconnecting said first circuit means and said impulse generating means.

13. A system for determining the major sequence of a pair of alternate sinusoidally periodic sequence signals applied thereto comprising circuit means for producing impulses at the time of each negative peak amplitude of the applied pair of sequence signals, circuit means responsive to said impulses for separating the applied pair of sequence signals into the componential sequence signals thereof, circuit means for reversing the polarity of one of said componential sequence signals, circuit means for developing a resultant difference signal having a polarity correlative to the major one of said componential sequence signals, integrator means for developing an output signal from said resultant difference signal during a predetermined integrating time interval, timing circuit means responsive to said impulses for establishing said integrating time interval, and circuit means responsive to the output signal of said integrator means for applying a signal representative of the major sequence signal to an utilization device.

14. A system according to claim 13 wherein said integrator means includes circuit means for continuing the development of said output signal after the expiration of said integrating time interval.

15. A system according to claim 13 wherein said timing means includes a first relay amplifier circuit for initiating the integrating time interval, and a second relay amplifier circuit for determining the duration of said integrating time interval.

16. A system according to claim 13 and further including circuit means for transmitting the major one of said componential sequence signals to an utilization device.

17. Apparatus for comparing a plurality of signals comprising a first signal source, a second signal source of the same signal polarity as said first signal source, means connected to said first and second signal sources for subtracting said first signal from said second signal to produce a resultant signal, said subtracting means including means to prevent each of said first and second signals from changing polarity, an integrator having input and output terminals, means for coupling the resultant signal to said input terminal, means for coupling the output terminal to a polarity responsive circuit, thereby indicating which of said signals is of greater amplitude.

18. The apparatus of claim 17 wherein said polarity responsive circuit includes polarized relay means for feeding the greater amplitude signal to a utilization device.

References Cited in the file of this patent

UNITED STATES PATENTS

| | | |
|---|---|---|
| 2,568,375 | Toulon | Sept. 18, 1951 |
| 2,659,823 | Vossbery | Nov. 17, 1953 |
| 2,712,898 | Knutsen | July 12, 1955 |
| 2,725,549 | Dunnet | Nov. 29, 1955 |
| 2,752,589 | Delong | June 26, 1956 |
| 2,776,418 | Townsend | Jan. 1, 1957 |
| 2,785,388 | McWhirter et al. | Mar. 12, 1957 |